US010600218B2

United States Patent
Ito

(10) Patent No.: US 10,600,218 B2
(45) Date of Patent: Mar. 24, 2020

(54) DISPLAY CONTROL SYSTEM, DISPLAY CONTROL APPARATUS, DISPLAY CONTROL METHOD, AND STORAGE MEDIUM

(71) Applicant: CANON KABUSHIKI KAISHA, Tokyo (JP)

(72) Inventor: Yoshiharu Ito, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 885 days.

(21) Appl. No.: 15/141,023

(22) Filed: Apr. 28, 2016

(65) Prior Publication Data

US 2016/0328201 A1    Nov. 10, 2016

(30) Foreign Application Priority Data

May 8, 2015   (JP) ................................. 2015-095883

(51) Int. Cl.
*G06T 11/60*        (2006.01)
*H04N 5/247*        (2006.01)
(Continued)

(52) U.S. Cl.
CPC .............. *G06T 11/60* (2013.01); *G06F 3/042* (2013.01); *H04N 5/247* (2013.01);
(Continued)

(58) Field of Classification Search
CPC ........... G06F 3/005; G06F 3/042; H04N 7/15; H04N 7/147; H04N 7/142; H04N 5/2624; H04N 7/18; H04N 5/247; H04N 5/272; H04N 21/2187; H04N 21/2665; H04N 5/2628; H04N 5/45; H04N 5/232; G06T 11/60

See application file for complete search history.

(56) References Cited

U.S. PATENT DOCUMENTS 5,757,424 A *  5/1998  Frederick ............... H04N 7/147
                                                    348/14.12
6,281,930 B1 *  8/2001  Parker .................... H04N 5/232
                                                    250/206.2

(Continued)

FOREIGN PATENT DOCUMENTS

JP          11-75174 A      3/1999
JP       2008-191613 A      8/2008

*Primary Examiner* — Chun-Nan Lin
(74) *Attorney, Agent, or Firm* — Canon USA, Inc., IP Division

(57) ABSTRACT

A first imaging unit and a second imaging unit are installed on a first site. An image captured by the first imaging unit and an image captured by the second imaging unit can be alternately displayed on a screen installed on a second site. When a first image, generated based on the image captured by the first imaging unit, is to be displayed on the screen, a display control system displays the first image on the screen irrespective of a position of a predetermined subject included in the first image. When a target image to be displayed on the screen is a second image generated based on the image captured by the second imaging unit, the display control system displays the second image in such a way as to locate an image of a predetermined subject included in the second image at a predetermined position of the screen.

14 Claims, 12 Drawing Sheets

(51) Int. Cl.
 *G06F 3/042* (2006.01)
 *H04N 7/18* (2006.01)
 *H04N 5/262* (2006.01)
 *H04N 7/14* (2006.01)
 *H04N 7/15* (2006.01)

(52) U.S. Cl.
 CPC ........... *H04N 5/2624* (2013.01); *H04N 7/142* (2013.01); *H04N 7/147* (2013.01); *H04N 7/15* (2013.01); *H04N 7/18* (2013.01)

(56) References Cited

U.S. PATENT DOCUMENTS

| | | | |
|---|---|---|---|
| 6,922,494 | B1 | 7/2005 | Fay |
| 8,300,081 | B1 | 10/2012 | Sawyer |
| 8,970,704 | B2 * | 3/2015 | Clavenna, II ...... H04N 21/2187 348/159 |
| 8,994,775 | B2 | 3/2015 | Lee et al. |
| 9,030,520 | B2 | 5/2015 | Chu et al. |
| 9,363,476 | B2 | 6/2016 | Fish et al. |
| 2001/0026247 | A1 | 10/2001 | Nishio et al. |
| 2009/0199078 | A1 | 8/2009 | Caspi et al. |
| 2012/0293606 | A1 | 11/2012 | Watson et al. |
| 2013/0050398 | A1 | 2/2013 | Krans et al. |
| 2013/0222521 | A1 | 8/2013 | Lee et al. |
| 2013/0335508 | A1 | 12/2013 | Mauchly |
| 2014/0063178 | A1 | 3/2014 | Krans et al. |
| 2014/0165006 | A1 * | 6/2014 | Chaudhri ............ G06F 3/04817 715/835 |
| 2014/0313277 | A1 * | 10/2014 | Yarosh .................... H04N 7/15 348/14.08 |
| 2015/0009278 | A1 | 1/2015 | Modai et al. |
| 2015/0145950 | A1 * | 5/2015 | Murphy ............ H04N 5/23238 348/36 |
| 2015/0163400 | A1 | 6/2015 | Geiss et al. |
| 2016/0080691 | A1 | 3/2016 | Yarosh et al. |
| 2016/0212358 | A1 * | 7/2016 | Shikata ................ H04N 1/2112 |
| 2016/0260236 | A1 | 9/2016 | Fogarty et al. |
| 2016/0330406 | A1 | 11/2016 | Muramatsu |
| 2016/0330407 | A1 | 11/2016 | Okuma |
| 2017/0289411 | A1 * | 10/2017 | Ikeda ........................ G06T 1/00 |

* cited by examiner

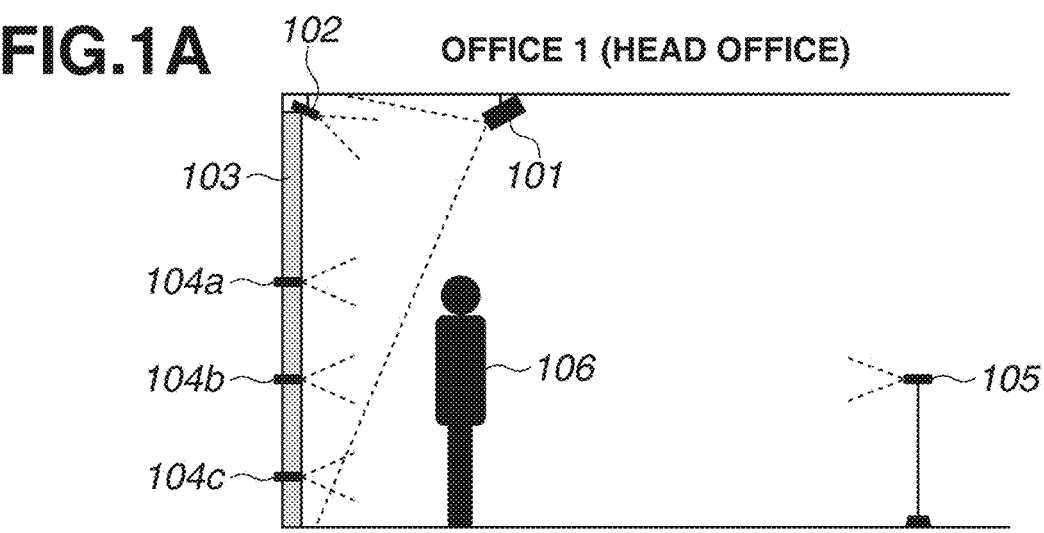
FIG.1A OFFICE 1 (HEAD OFFICE)
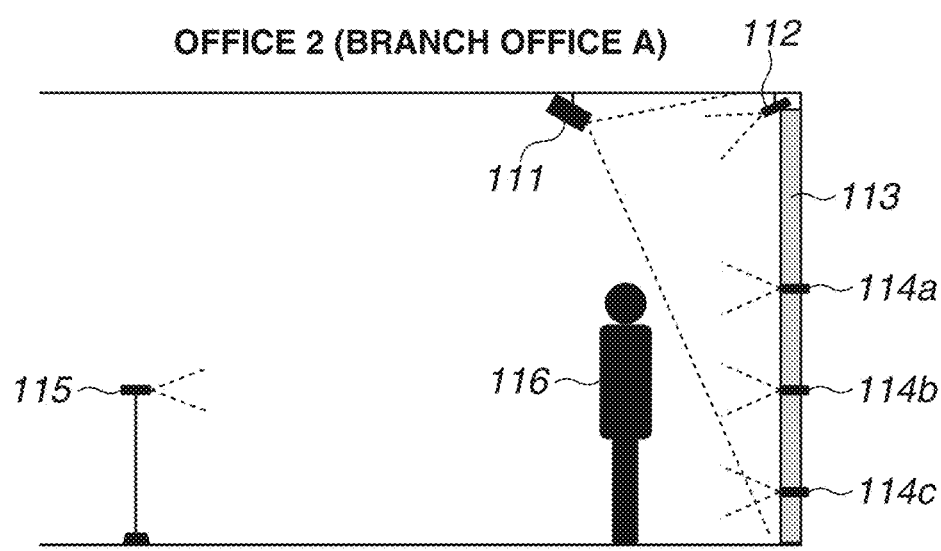
FIG.1B OFFICE 2 (BRANCH OFFICE A)
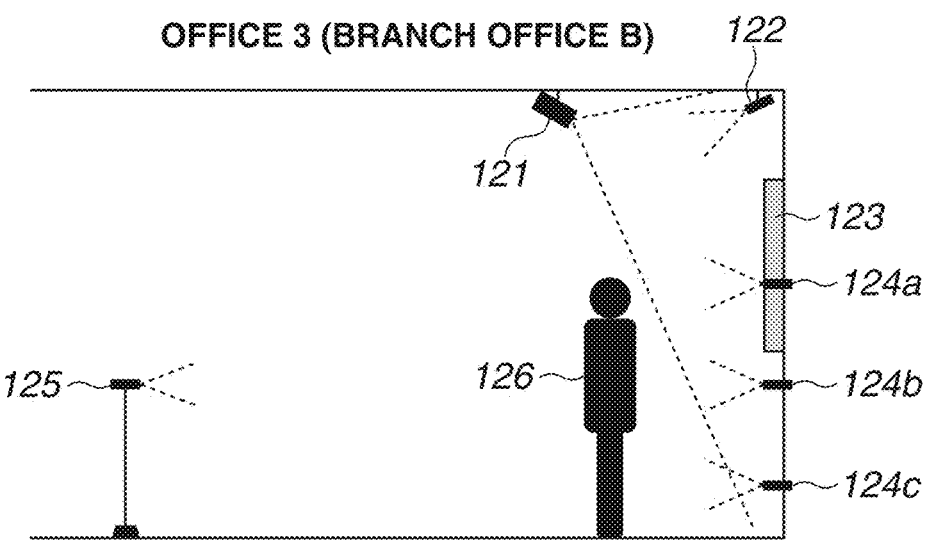
FIG.1C OFFICE 3 (BRANCH OFFICE B)

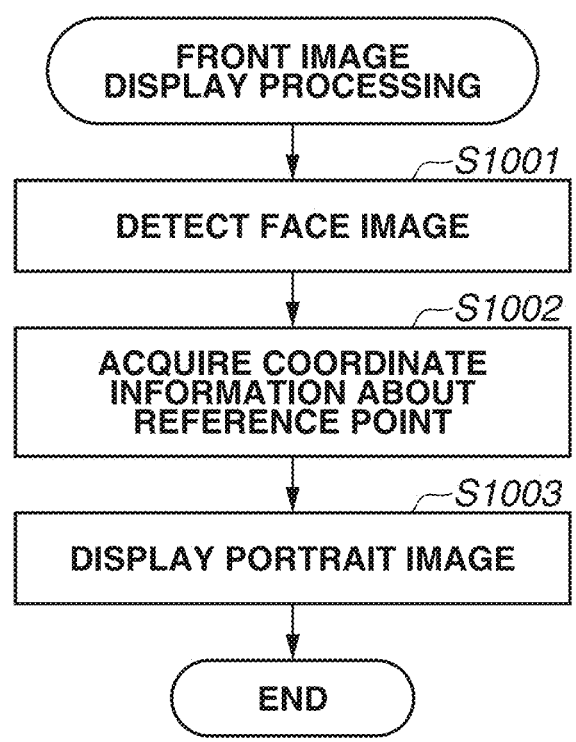

DISPLAY OF IMAGE BASED ON IMAGE
CAPTURED BY FRONT SIDE CAMERA 114

DISPLAY OF IMAGE BASED ON IMAGE
CAPTURED BY REAR SIDE CAMERA 115

DISPLAY CONTROL SYSTEM, DISPLAY CONTROL APPARATUS, DISPLAY CONTROL METHOD, AND STORAGE MEDIUM

BACKGROUND OF THE INVENTION

Field of the Invention

The present disclosure relates to a display control system, a display control apparatus, a display control method, and a storage medium.

Description of the Related Art

There is a conventional communication system that enables a user to communicate with a partner in a remote place. For example, a remote conference system discussed in Japanese Patent Application Laid-Open No. 2008-191613 enables a user to hold a conference with a partner in a remote place. The system discussed in Japanese Patent Application Laid-Open No. 2008-191613 includes a camera that captures an image of a person, a projector that projects the image captured by the camera, and a screen that displays the image projected by the projector.

According to the system discussed in Japanese Patent Application Laid-Open No. 2008-191613, a person image captured by a camera equipped in a conference room can be projected on a screen by a projector at a partner side (i.e., a remote place). On the other hand, a person image captured by a partner side camera can be projected on a screen by a projector provided in the conference room. Further, as discussed in Japanese Patent Application Laid-Open No. 2008-191613, displaying a life-size image of each person can enhance the presence in conference.

A communication system discussed in Japanese Patent Application Laid-Open No. 11-75174 can adjust gazing directions between communicating persons. More specifically, the system discussed in Japanese Patent Application Laid-Open No. 11-75174 causes the display position of a partner image to move on a screen so that a predetermined positional relationship can be kept between a setup position of a camera that captures an image of a user and a display position of a partner image, thereby causing the gazing directions of the communicating persons to match each other.

The system discussed in Japanese Patent Application Laid-Open No. 11-75174 intends to reproduce a virtual state where communicating persons constantly face each other, for example, in a counseling. To this end, the system discussed in Japanese Patent Application Laid-Open No. 11-75174 performs a display control in such a way as to locate a partner image constantly at the center of the screen (i.e., the camera setup position) so that the gazing directions of the communicating persons match each other.

However, for example, in some situations, the conference may smoothly advance by displaying an image of a conference material at the center of a screen rather than displaying a person image. In such a case, user-friendliness will be enhanced if a user can arbitrarily determine the layout of the conference material image instead of continuing the above-mentioned adjustment of the gazing directions between the communicating persons.

In this respect, the conventional systems tend to deteriorate the user-friendliness because processing of correcting the display position of a partner image is performed constantly without considering user's interest or concern about the partner image.

SUMMARY OF THE INVENTION

A display control system according to an exemplary embodiment of the present disclosure includes a first imaging unit installed on a first site and configured to image a first subject in a state where the first imaging unit is directed from a first spot of the first site toward a first screen of the first site and a second imaging unit installed on the first site and configured to image at least a part of the first subject in a state where the second imaging unit is positioned at a second spot on the first screen side when seen from a position of the first subject. The display control system further includes a display control unit configured to perform control to display a first image, generated based on an image captured by the first imaging unit, on a second screen installed on a second site, in such a way as to display a first subject image on the second screen according to a position of the first subject image included in the first image. Further, the display control unit is configured to perform control to display a second image, generated based on an image captured by the second imaging unit, on the second screen, in such a way as to display the first subject image included in the second image at a predetermined position of the second screen. The predetermined position is a position corresponding to a setup position of a third imaging unit installed on the second site and configured to image a second subject from the second screen side.

According to other aspects of the present disclosure, one or more additional display control systems, one or more display control apparatuses, one or more display control methods and one or more storage mediums are discussed herein. Further features of the present disclosure will become apparent from the following description of exemplary embodiments with reference to the attached drawings.

BRIEF DESCRIPTION OF THE DRAWINGS

FIGS. 1A, 1B, and 1C are cross-sectional views respectively illustrating a remote communication system.

FIG. 10 is a flowchart illustrating front image display processing.

DESCRIPTION OF THE EMBODIMENTS

Figure 2:
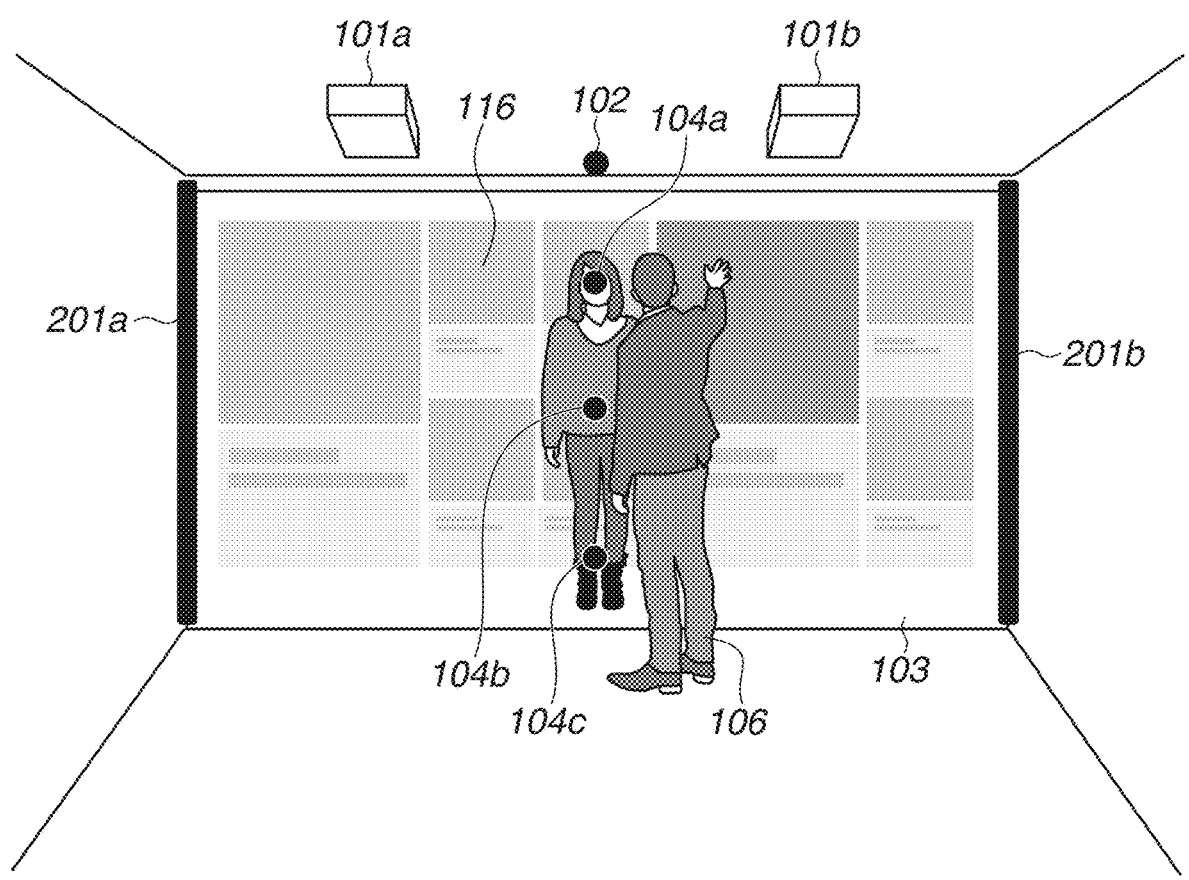
FIG. 2 illustrates an overall view of the remote communication system.

Exemplary embodiments of the present disclosure will be described in detail below with reference to attached drawings. The following exemplary embodiments do not intend to limit the scope of the disclosure narrowly. Further, features described in respective exemplary embodiments and possible combinations thereof do not intend to limit the solving means of the present disclosure strictly.

FIGS. 1A to 1C are cross-sectional views illustrating a remote communication system (i.e., a display control system) according to the present disclosure. The remote communication system enables users to communicate with each other between an office 1 (i.e., a first site) provided in a head office and an office 2 (i.e., a second site) provided in a branch office A, or between the office 1 and an office 3 provided in a branch office B. Although the total number of the offices illustrated in FIGS. 1A to 1C is three, the number of the offices can be two. Further, an entire configuration including a plurality of offices can be referred to as the remote communication system. An internal configuration of a single office can be referred to as the remote communication system.

An office constituting the remote communication system can be located at a remote place requiring several hours to reach or can be another conference room provided in the same building. More specifically, the expression "remote" indicates that physical spaces are different. In other words, the expression "remote" does not define any physical distance or any time required to reach.

A projector 101, a background camera 102, a screen 103, three front side cameras 104, and a rear side camera 105 are provided in the office 1 illustrated in FIG. 1A. The projector 101 is a projection apparatus that can project an image, which has been captured by a camera in another office, on the screen 103. In the present exemplary embodiment, the projector 101 projects a moving image, which is constituted by a plurality of still images (i.e., frame images), on the screen 103, as described in detail below. The screen 103 is a projection plane on which an image projected by the projector 101 can be displayed. The screen 103 can be temporarily installed for communications to be performed between the office 1 and another office. Further, an office wall can be used as the screen 103. Furthermore, a large-scale liquid crystal display device can be used to display an image, while the combination of the projector 101 and the screen 103 is an image display unit according to the present exemplary embodiment.

Each of the front side cameras 104 is an imaging apparatus that can capture an image of a person 106. The front side camera 104 can image at least a part of a subject from a second spot positioned on a screen side when seen from the subject. In the present exemplary embodiment, three front side cameras 104a, 104b, and 104c are provided to image the person 106 entirely. However, the total number of the front side cameras can be two or can be four or more. An example of processing for imaging the person 106 with the front side cameras 104 will be described in detail below.

The background camera 102 is an imaging apparatus that can capture a background image of the person 106. More specifically, the background camera 102 is directed to the right in FIG. 1A. The office 1 is a general clerk's room provided for daily works and is not a special room dedicated to remote communications. The background image captured by the background camera 102 includes clerk's desks, cabinets, and a person who is working for another task. By projecting the above-mentioned background together with a person captured by the front side cameras 104, it is feasible to create a special atmosphere as if the person stands talking at a corner of the office. In general, it is desired that the background camera 102 is disposed highly in the vertical direction (in the vicinity of a ceiling) so that the imaging of the background can be prevented from being obstructed by the person 106.

The rear side camera 105 is an imaging apparatus that can image the person 106 or a projected image on the screen 103 (i.e., a second screen). The rear side camera 105 is directed from right to left in FIG. 1A. In other words, the rear side camera 105 is positioned at a first spot and directed toward the second screen 103 so that a subject (e.g., a person) can be imaged.

The distance between the rear side camera 105 and the person 106 is longer than the distance between the front side camera 104 and the person 106. Therefore, it is feasible to capture an entire image of the person 106 with the single rear side camera 105.

The front side camera 104 includes a distance sensor that can detect the distance between the front side camera 104 and the subject. An image obtained by each front side camera 104 includes an RGB color image constituted by 8-bit and 3-channel information, and a distance image constituted by 8-bit and 1-channel information. On the other hand, the background camera 102 and the rear side camera 105 do not include any device capable of detecting the distance. Accordingly, images obtained by the background camera 102 and the rear side camera 105 do not include any distance image although an RGB color image constituted by 8-bit and 3-channel information is included.

The office 2, in which a person 116 is standing (see FIG. 1B), includes a projector 111, a background camera 112, a screen 113 (i.e., a first screen), front side cameras 114 (i.e., a second imaging unit), and a rear side camera 115 (i.e., a first imaging unit), which are similar to the counterparts provided in the office 1. Further, the office 3, in which a person 126 is standing (see FIG. 1C), includes a projector 121, a background camera 122, a screen 123, front side cameras 124, and a rear side camera 125, which are similar to the counterparts provided in the office 1 or 2. The screens 103 and 113 are substantially the same in size, more specifically, 2.3 meters in the vertical direction and 4 meters in the horizontal direction. On the other hand, the size of the screen 123 is 1 meter in the vertical direction and 2 meters in the horizontal direction. In other words, the screen 123 is comparatively smaller. Using the office 1 and the office 2 is recommendable if it is desired to perform remote communications while viewing the entirely projected state because these offices are equipped with the large screens. However, using the office 3 may be useful if an available space is limited. In this case, the screen 123 is not sufficiently large to display the entire image of a person in a remote place. For example, only the upper half of the person's body can be projected on the screen 123.

FIG. 2 illustrates an overall view of the remote communication system, which is seen from right to left in FIG. 1A, according to which the person 106 is standing in the office 1 and communicating with the person 116 (i.e., the person standing in the office 2) projected on the screen 103. Although two projectors 101a and 101b are provided because the screen 103 is long from side to side, these projectors can be replaced by a single projector. The background camera 102 is located at the top center of the screen 103. The front side cameras 104a, 104b, and 104c are embedded in the screen 103 and vertically disposed in a row at a central portion of the screen 103.

The digitizer 201 is a detection apparatus that can detect a user operation performed on the screen 103. The digitizer 201 includes a transmitter 201a and a receiver 201b. When infrared light emitted from the transmitter 201a is obstructed by a part of the body of the person 106 or a pointer held by the person 106, the digitizer 201 outputs coordinate information indicating the detected position. In the present exemplary embodiment, the transmitter 201a and the receiver 201b are disposed at right and left edges of the screen 103. Alternatively, the transmitter 201a and the receiver 201b can be disposed at upper and lower edges of the screen 103. Further, another method capable of detecting a user operation is employable instead of using the digitizer. For example, a pressed position on the screen 103 can be detected if the screen 103 is configured to have a touch panel function.

A portrait image of the person 116, which has been obtained by the front side cameras 114 (i.e., the second imaging unit) provided in the office 2, is projected on the screen 103. A background of the person 116 illustrated in FIG. 2 is a document (e.g., a conference material) stored in a document management server 340. A network interface (I/F) 311 inputs a document image stored in the document management server 340 to a control apparatus 310. The background of the person 116 to be projected on the screen 103 is switchable between the document stored in the document management server 340 and the background image of the office 2 obtained by the background camera 112 according to an operation of the person 116 detected by the digitizer 201.

Figure 3:
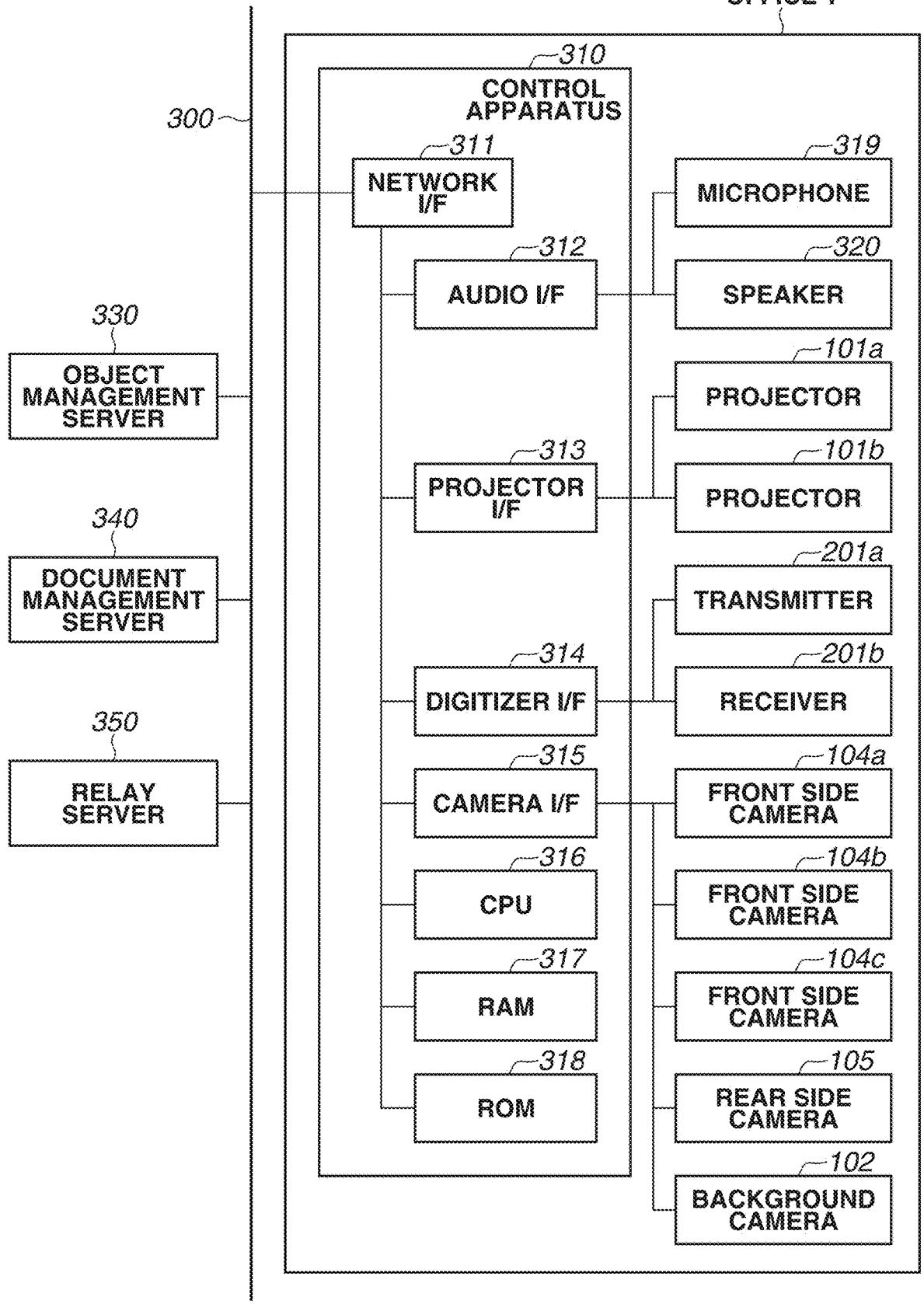
FIG. 3 illustrates a hardware configuration of the remote communication system.

FIG. 3 illustrates a hardware configuration of the remote communication system. The control apparatus 310 includes a central processing unit (CPU) 316 that can read a control program from a read only memory (ROM) 318 and control each apparatus provided in the office 1. A random access memory (RAM) 317 can be used as a temporary storage region (e.g., a main memory or a work area) for the CPU 316. In the office 1, it is assumed that the single CPU (i.e., CPU 316) performs each processing of flowcharts described in detail below in association with the single memory (i.e., the RAM 317). However, another configuration is employable for the office 1. For example, a plurality of units (e.g., the cameras, the projector, and the digitizer) can be respectively configured to include a control device comparable to the control apparatus 310. In this case, a plurality of CPUs and RAMs cooperates with a hard disk drive (HDD) or a solid state drive (SSD) to perform each processing. Further, an appropriate hardware circuit, such as an application specific integrated circuit (ASIC), is usable to perform a part of the processing described below.

A network 300 is a network that connects respective offices. The type of the network 300 can be appropriately selected from wired, wireless, wide area network (WAN), local area network (LAN), public communication line, and private communication line, considering the environment. The office 1 is connected to the network I/F 311 via the network 300.

Although not illustrated in FIGS. 1 and 2, a microphone and a speaker are installed in each office. The microphone can convert the voice of a person in the office into an audio signal. The collected voice can be output from a speaker installed in a remote place. For example, a microphone 319 and a speaker 320 are provided in the office 1. An audio I/F 312 is an interface capable of controlling an audio input operation to be performed by the microphone 319 and an audio output operation to be performed by the speaker 320.

A projector I/F 313 is an interface capable of controlling an image projection to be performed by the projectors 101a and 101b. A digitizer I/F 314 is an interface capable of controlling the digitizer 201 that detects a user operation. A camera I/F 315 is an interface capable of controlling image capturing operations to be performed by the front side cameras 104, the rear side camera 105, and the background camera 102.

The projector I/F 313 controls the projectors 101a and 101b in such a way as to display on the screen 103 a first image generated based on an image captured by the camera 115. The first image will be described in detail below with reference to FIG. 12B.

Further, the projector I/F 313 controls the projectors 101a and 101b in such a way as to display on the screen 103 a second image generated based on images captured by the cameras 114. The second image will be described in detail below with reference to FIG. 6 and FIG. 12A.

The projector I/F 313 controls the projectors 101a and 101b in such a way as to display the first image and the second image alternately on the screen 103.

Further, when the image to be displayed on the screen 103 is the first image, the projector I/F 313 performs control to display the first image on the screen 103 irrespective of the position of a subject image included in the first image. Furthermore, when the image to be displayed on the screen 103 is the second image, the projector I/F 313 performs control to display a subject image included in the second image at a predetermined position of the second screen.

Although not illustrated in the drawings, equipments provided in the offices 2 and 3 are similar those in the office 1. Further, universal serial bus (USB), high definition multimedia interface (HDMI) (registered trademark), wired LAN, and wireless LAN can be appropriately employed for the above-described interfaces.

When an image captured in an office is transmitted to another office, a relay server 350 can relay the image together with input voices. The document management server 340 can store documents (e.g., conference materials) to be projected on the screen by the projector equipped in each office. If projecting a document together with a person is instructed as illustrated in FIG. 2, the CPU 316 acquires designated document data from the document management server 340 and causes the projectors 101a and 101b to project an image of the acquired document. The projection of a document can be instructed by a user who is in an office to perform the remote communication.

An object management server 330 stores an object to be projected on the screen 103 by the projectors 101a and 101b in a case where the screen 103 is used as an operation unit of the remote communication system. For example, an operation button usable to select a connection destination office is an example of the object to be projected. If the remote communication system is activated in the office 1, the CPU 316 acquires selection buttons corresponding to respective offices from the object management server 330, and causes the projectors 101a and 101b to project the acquired selection buttons on the screen 103. If the person 106 touches the screen 103, the digitizer 201 detects coordinates of the touched position and the CPU 316 identifies a selection button corresponding to the detected coordinates. Then, the CPU 316 starts remote communications with a control apparatus of an office corresponding to the identified selection button.

Figure 4:
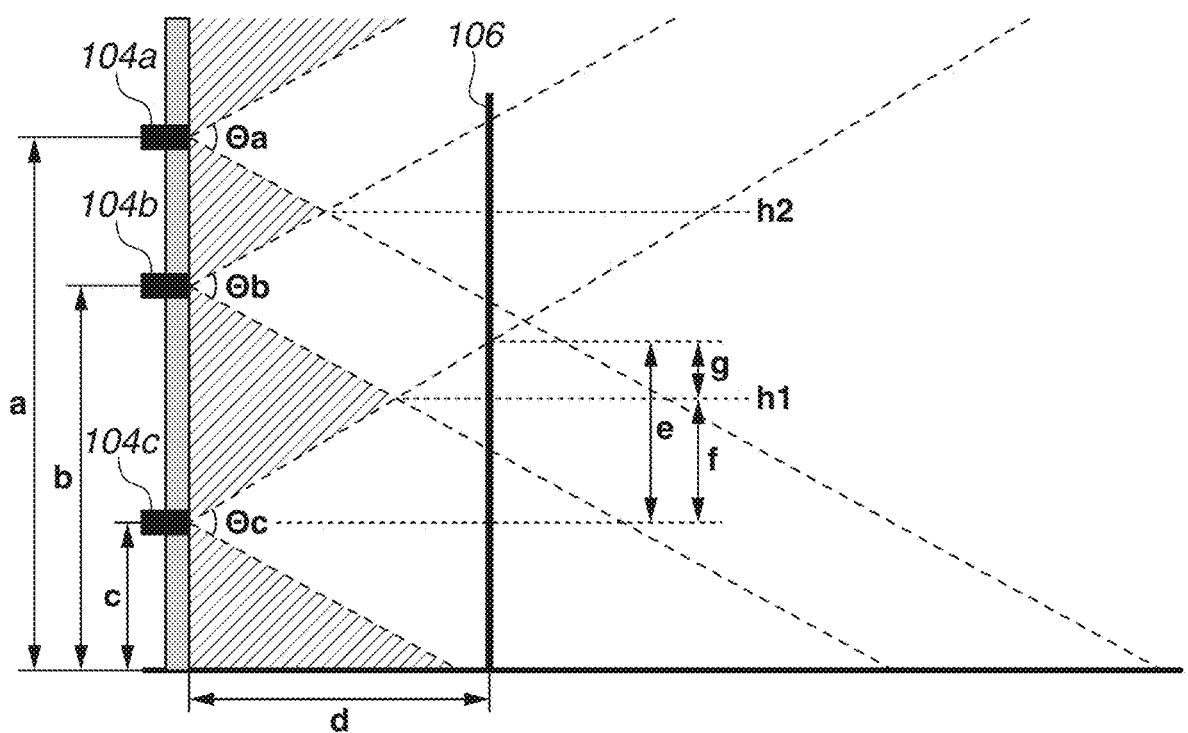
FIG. 4 illustrates imaging ranges of respective front side cameras.

FIG. 4 illustrates imaging ranges of respective front side cameras 104. Setup positions of the front side cameras 104a, 104b, and 104c from a floor surface are defined by height a (1800 mm), height b (1300 mm), and height c (500 mm), respectively. More specifically, the arrangement interval (500 mm) between the front side camera 104a and the front side camera 104b is less than the arrangement interval (800 mm) between the front side camera 104b and the front side camera 104c. Further, the arrangement interval (800 mm) between the front side camera 104b and the front side camera 104c is greater than the distance from the front side camera 104c to the floor surface. The above-mentioned camera layout is useful to locate the boundary between two images to be combined in portrait image combination described below (see FIGS. 5 and 6) at an inconspicuous position (e.g., somewhere near a chest or a waist) of a person.

Field angles of the front side cameras 104a, 104b, and 104c are θ(theta)a, θb, and θc, respectively, in the vertical direction. A distance d from each front side camera 104 to the person 106 can be calculated based on distance images obtained by respective front side cameras 104. A height h1 represents the height of an intermediate position between the front side camera 104b and the front side camera 104c. A length f is a value obtainable by dividing an altitudinal difference between the front side camera 104b and the front side camera 104c by 2. The height h1 can be calculated by adding the length f to the height c of the front side camera 104c. Similarly, a height h2 represents the height of an intermediate position between the front side camera 104a and the front side camera 104b. The height h2 can be calculated by adding a length obtainable by dividing an altitudinal difference between the front side camera 104a and the front side camera 104b by 2 to the height b of the front side camera 104b.

A length e represents a difference between the height of an uppermost portion of the person 106 captured by the front side camera 104c and the height c of the front side camera 104c. A length e can be obtained based on an angle obtained by dividing the field angle θc by 2 and the distance d from the front side camera 104 to the person 106.

In the present exemplary embodiment, it is assumed that each of the cameras 104a, 104b, and 104c captures an image of the person 106 so that the width of each captured person image becomes equal to a predetermined size in the horizontal direction. Alternatively, the cameras 104a, 104b, and 104c can be configured to capture images of the person 106 that are mutually different in width in the horizontal direction. In this case, an entire image of the person 106 can be generated in combination processing described below by modifying images captured by respective cameras in such a way as to equalize the widths of the person images in the horizontal direction and then combining modified images.

Figure 5:
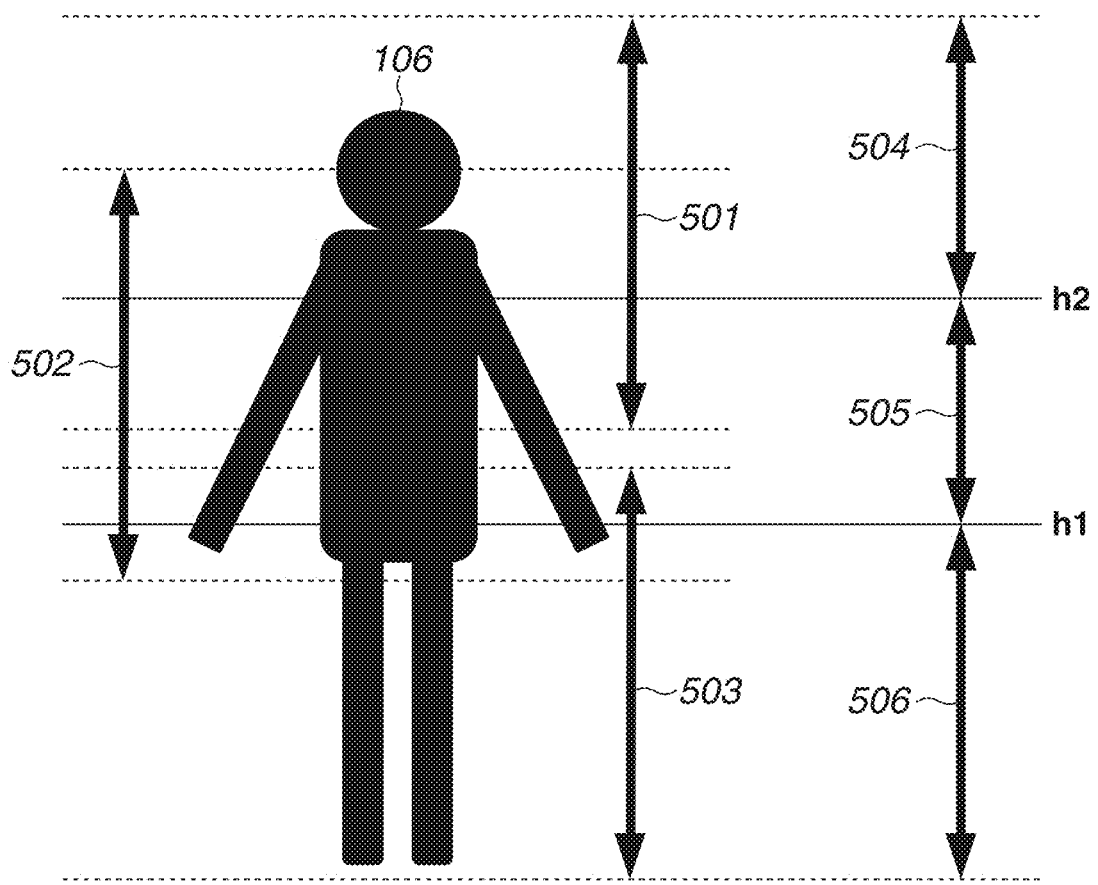
FIG. 5 illustrates a relationship between trimming processing and imaging ranges of respective front side cameras.

Processing for combining the images captured by respective front side cameras 104 will be described in detail below with reference to FIGS. 5 and 6. In FIG. 5, each of lengths 501, 502, and 503 indicates the range of the person 106 captured by the front side cameras 104a, 104b, and 104c, respectively. As illustrated in the drawing, the range 501 of the person 106 captured by the front side camera 104a and the range 502 of the person 106 captured by the front side camera 104b are partly overlapped. Similarly, the range 502 of the person 106 captured by the front side camera 104b and the range 503 of the person 106 captured by the front side camera 104c are partly overlapped.

The remote communication system (i.e., the display control system) according to the present exemplary embodiment performs processing for deleting the overlapped portion in a process of combining the images obtained by respective front side cameras 104. In this case, the display control system designates the positions corresponding to the height h1 and height h2 as boundaries of the images to be combined. As a result, the display control system designates the image obtained by the front side camera 104a as an image to be used for a range 504 and designates the image obtained by the front side camera 104b as an image to be used for a range 505. Further, the display control system designates the image obtained by the front side camera 104c as an image to be used for a range 506.

Figure 6A:
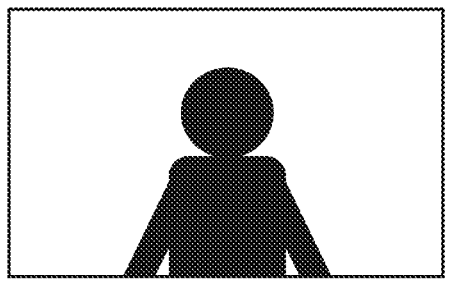
FIGS. 6A, 6B, 6C, 6D, 6E, and 6F illustrate a relationship between trimming processing and imaging ranges of respective front side cameras.
Figure 6B:
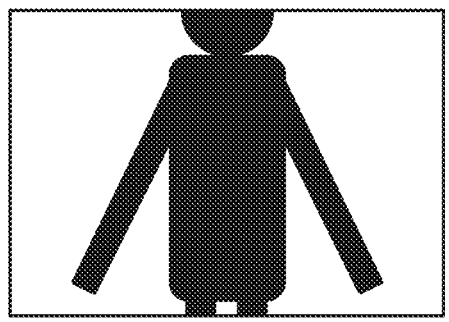
Figure 6C:
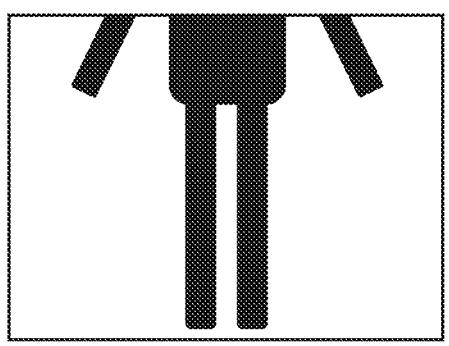

FIGS. 6A, 6B, and 6C illustrate partial images obtained by the front side cameras 104a, 104b, and 104c. More specifically, FIGS. 6A, 6B, and 6C illustrate a plurality of images captured by a plurality of cameras 104 positioned on the screen 103 side when seen from the subject. The image illustrated in FIG. 6A corresponds to the range 501 illustrated in FIG. 5. However, the image to be used for the projection at a remote place is the range 504. Therefore, the display control system obtains a partial image illustrated in FIG. 6D by removing an overlapped range corresponding to a difference between the range 501 and the range 504. Similarly, the image illustrated in FIG. 6B corresponds to the range 502 illustrated in FIG. 5. However, the image to be used for the remote place projection is the range 505. Therefore, the display control system obtains a partial image illustrated in FIG. 6E by removing an overlapped range corresponding to a difference between the range 502 and the range 505. Similarly, the image illustrated in FIG. 6C corresponds to the range 503 illustrated in FIG. 5. However, the image to be used for the remote place projection is the range 506. Therefore, the display control system obtains a partial image illustrated in FIG. 6F by removing an overlapped range corresponding to a difference between the range 503 and the range 506. The display control system obtains an entire image of the person 106 by combining (or connecting) the partial images illustrated in FIGS. 6D, 6E, and 6F having been obtained through the above-mentioned processing. As mentioned above, the display control system can generate an image of a human feature portion (i.e., the second image) by combining partial images extracted from a plurality of images captured by the plurality of cameras 104.

Hereinafter, processing for generating the image illustrated in FIG. 6F from the image illustrated in FIG. 6C will be described in detail below. The central position of the image illustrated in FIG. 6C coincides with the setup position (height c) of the front side camera 104c. An image positioned higher than the central position corresponds to the range of the length e illustrated in FIG. 4. The display control system obtains an image corresponding to the range of the length f by removing an image corresponding to the range of a length g from the image included in the range of the length e. To this end, the display control system determines the number of pixels corresponding to a ratio of the length g to the length e, as a removal target, in a half of the region constituted by vertical pixels (1080 pixels) of the front side camera 104c. Similarly, the display control system determines targets to be removed from the images illustrated in FIGS. 6A and 6B.

Figure 7:
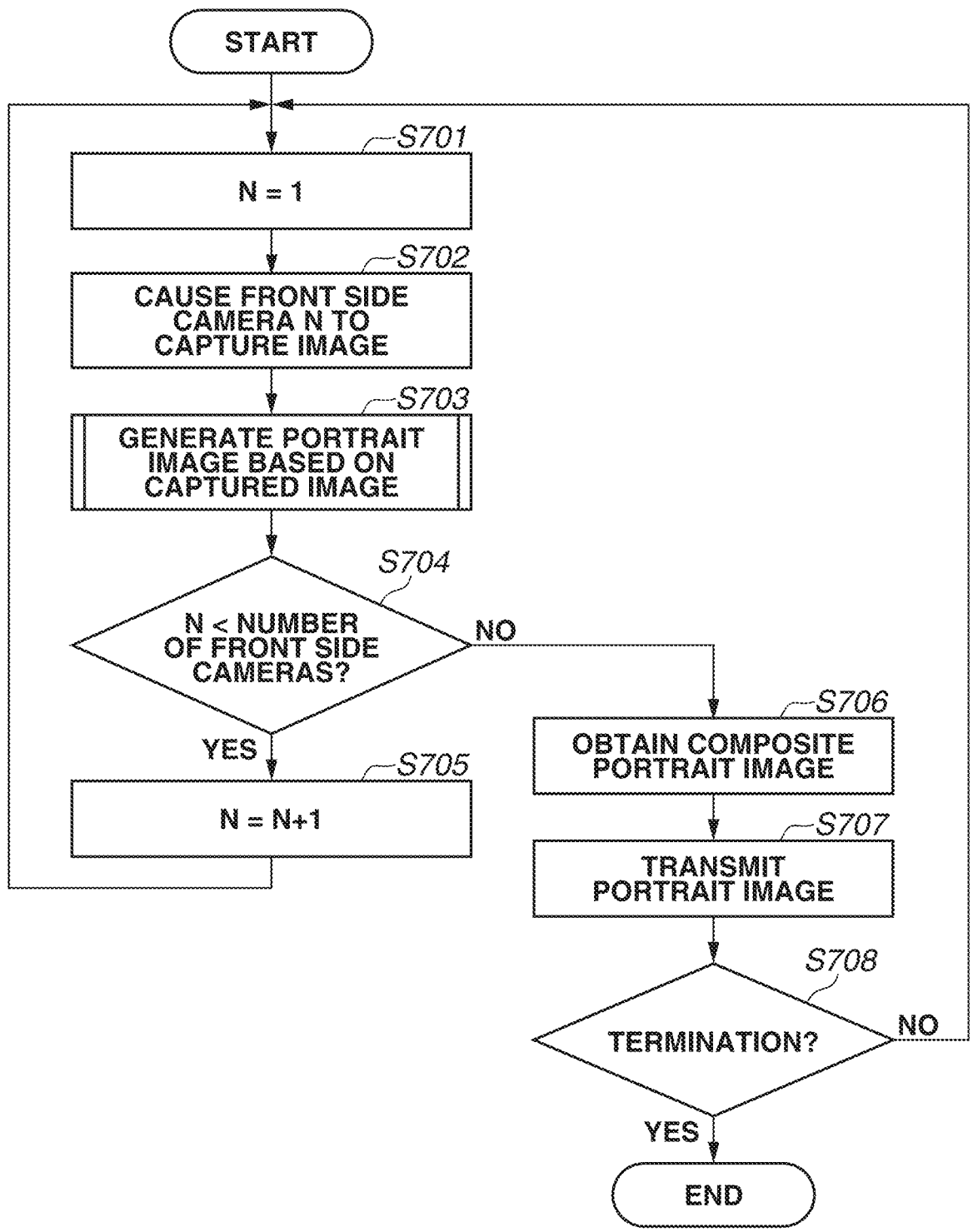
FIG. 7 is a flowchart illustrating a person image capturing operation.
Figure 8:
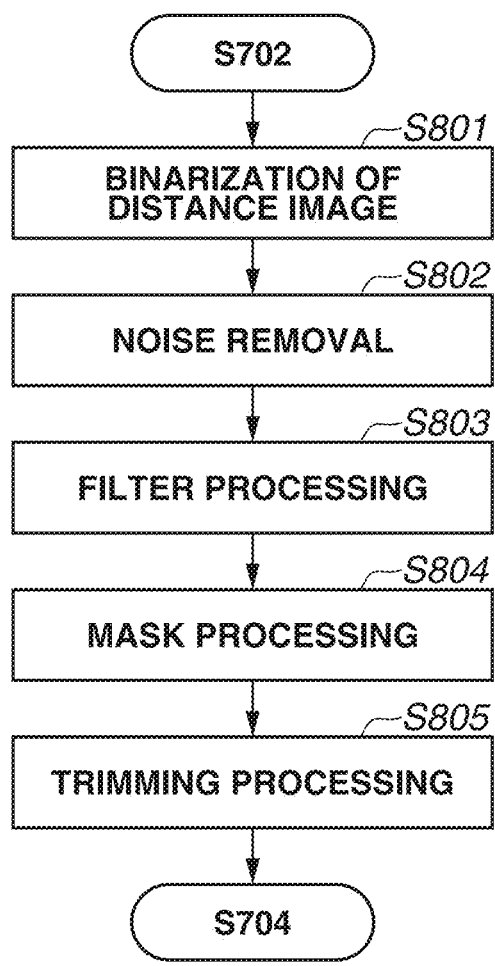
FIG. 8 is a flowchart illustrating person image capturing processing.

FIGS. 7 and 8 are flowcharts illustrating processing for combining an image of the person 106 captured by the front side camera 104 with a portrait image obtained by the front side camera 104. To realize each operation (step) of the flowcharts illustrated in FIGS. 7 and 8, the CPU 316 of the office 1 executes the control program loaded from the ROM 318.

In step S701, the CPU 316 initializes the value of a variable N to 1. In step S702, the CPU 316 causes the front side camera 104 corresponding to the variable N (i.e., one of the front side cameras 104a, 104b, and 104c) to capture an image of the person 106. In step S703, the CPU 316 generates a portrait image based on the images captured by the front side camera 104 in step S702.

FIG. 8 is a flowchart illustrating details of processing to be performed in step S703. In step S801, the CPU 316 binarizes a distance image included in the image captured in step S702. In the present exemplary embodiment, it is assumed that the distance from the screen 103 (i.e., the front side camera 104) to the standing position of the person 106 is not less than 1 meter and not greater than 2 meters. Therefore, a minimum value and a maximum value having been set with respect to the distance from the front side camera 104 to the subject are 1 meter and 2 meters, respectively. The CPU 316 changes the value of each pixel of the distance image to 255 if it is included in the above-described range, and changes the values of other pixels to 0.

In step S802, the CPU 316 performs contraction processing for changing the value to 0 if there is any pixel having a value 0 in the vicinity of an interest pixel, or performs expansion processing for changing the value to 255 if there is any pixel having a value 255 in the vicinity of the interest pixel. Through the above-mentioned processing, isolated point noises can be removed. In step S803, the CPU 316 performs smoothing filter (e.g., Gaussian filter) processing for smoothing the contour of a region in which pixels having the value 255 are continuously present.

In step S804, the CPU 316 performs mask processing for bringing a color image pixel corresponding to a distance image pixel having the value 255 into a non-transparent state, and for bringing a color image pixel corresponding to a distance image pixel having the value 0 into a fully transparent state. Through the above-mentioned processing, a human feature portion can be extracted from the image captured by the front side camera 104. In the present exemplary embodiment, the "human feature portion" is not limited to a human body and includes a pointer or a trade sample held by a person. As mentioned above, the CPU 316 can extract an image portion of at least a part of a subject from a plurality of images captured by a plurality of cameras 104a, 104b, and 104c that are positioned on the screen 103 side when seen from the subject.

In step S805, the CPU 316 performs processing for trimming the portrait images illustrated in FIGS. 6A, 6B, and 6C at an upper or lower end thereof to generate the partial portrait images illustrated in FIGS. 6D, 6E, and 6F, as already described with reference to FIGS. 5 and 6A to 6F. The trimming processing to be performed on the portrait images illustrated in FIGS. 6A, 6B, and 6C is variable depending on the imaging apparatuses that obtain the portrait images illustrated in FIGS. 6A, 6B, and 6C.

Referring back to the flowchart illustrated in FIG. 7, in step S704, the CPU 316 determines whether the value of the variable N is smaller than the total number of the front side cameras 104 (i.e., 3 in the present exemplary embodiment). If the CPU 316 determines that the value of the variable N is smaller than the total number of the front side cameras 104 (Yes in step S704), the operation proceeds to step S705. In step S705, the CPU 316 increments the variable N by one. Subsequently, the operation returns to step S701. If the CPU 316 determines that the value of the variable N is not less than the total number of the front side cameras 104 (No in step S704), namely when the value of the variable N is equal to the total number of the front side cameras 104, the operation proceeds to step S706.

Figure 6D:
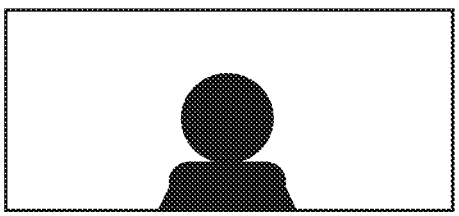
Figure 6E:
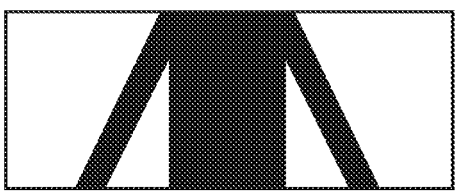
Figure 6F:
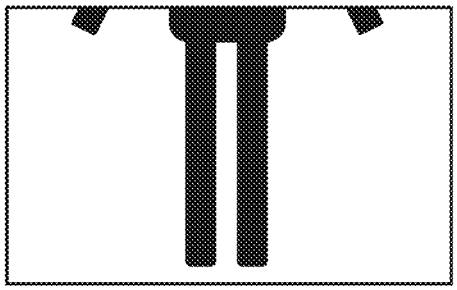

In step S706, the CPU 316 obtains a composite portrait image by combining the portrait images illustrated in FIGS. 6D, 6E, and 6F. More specifically, the CPU 316 combines these images by locating the image illustrated in FIG. 6E under the image illustrated in FIG. 6D and then locating the image illustrated in FIG. 6F under the image illustrated in FIG. 6E. Further, the CPU 316 performs processing for trimming the obtained composite image with a rectangle including all of pixels having the value 255 in such a way as to remove unnecessary margins remaining around the composite image. For example, there are unnecessary margins at an upper side of a head, a left side of a right hand, a right side of a left hand, and a lower side of legs.

In step S707, the CPU 316 transmits the composite portrait image obtained through the processing in step S706 to the office 2 (i.e., the connection destination). In step S708, the CPU 316 determines whether termination of the remote communication has been instructed. If the CPU 316 determines that the termination has been instructed (Yes in step S708), the CPU 316 terminates the processing of the flowchart illustrated in FIG. 7. On the other hand, if the CPU 316 determines that the termination has not been instructed (No in step S708), the operation returns to step S701. The CPU 316 repeats the above-mentioned processing in step S701 and subsequent steps.

In the present exemplary embodiment, the control apparatus 310 provided in the imaging side office in which the subject person is present performs the processing in step S703 and step S706. However, the projection side office in which the captured image is projected can be configured to perform the processing in step S703 and step S706. Further, the flowchart illustrated in FIG. 7 can be modified to perform human feature portion extraction processing in step S703 after completing the combination processing in step S706. Furthermore, although not described in the present exemplary embodiment, the CPU 316 transmits the image obtained by the background camera 102 and the image obtained by the rear side camera 105 to the office 2 (i.e., the connection destination) in synchronization or asynchronization with the transmission of the composite portrait image in step S707.

Figure 9:
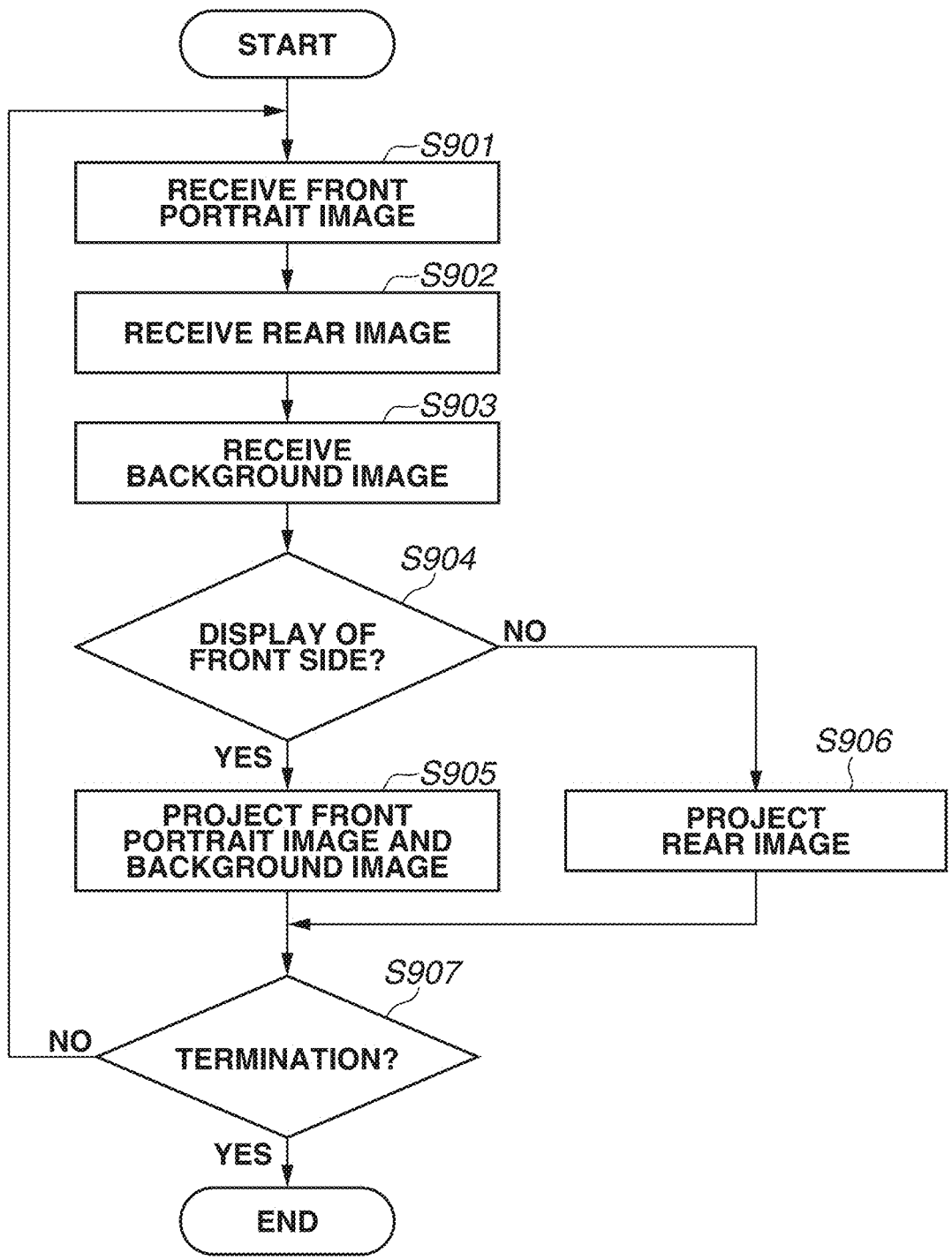
FIG. 9 is a flowchart illustrating image projection processing.

FIG. 9 is a flowchart illustrating processing for projecting an image transmitted from the connection destination office. To realize each operation (step) of the flowchart illustrated in FIG. 9, the CPU 316 of the office 1 executes the control program loaded from the ROM 318. In the present exemplary embodiment, it is assumed that a CPU provided in the office 2 performs the processing illustrated in FIGS. 7 and 8 to obtain a composite portrait image and the CPU 316 of the office 1 performs the processing for projecting the image transmitted from the office 2 as described in detail below.

In step S901, the CPU 316 receives a front portrait image obtained by the front side cameras 114. In step S902, the CPU 316 receives a rear image obtained by the rear side camera 115. In step S903, the CPU 316 receives a background image obtained by the background camera 112.

In step S904, the CPU 316 determines whether the display instruction by the person 106 is the front side of the person or the back side of the person. The CPU 316 accepts these instructions from the digitizer 201 that can detect an operation of the person 106. If the CPU 316 determines that the instructed display is the front side of the person (Yes in step S904), the operation proceeds to step S905. In step S905, the CPU 316 causes the projectors 101a and 101b to project on the screen 103 the front portrait image received in step S901 together with the background image received in step S903. On the other hand, if the CPU 316 determines that the instructed display is the back side of the person (No in step S904), the operation proceeds to step S906. In step S906, the CPU 316 causes the projectors 101a and 101b to project the rear image received in step S902 on the screen 103.

The display control processing to be performed in step S905 will be described in detail below with reference to FIGS. 10 and 11A to 11C. Further, the display control processing to be performed in step S906 will be described in detail below with reference to FIGS. 12A and 12B.

In step S907, the CPU 316 determines whether termination of the remote communication has been instructed. If it is determined that the termination has been instructed (Yes in step S907), the CPU 316 terminates the processing of the flowchart illustrated in FIG. 9. On the other hand, if the CPU 316 determines that the termination of the remote communication has not been instructed (No in step S907), the operation returns to step S901. The CPU 316 repeats the above-mentioned processing in step S901 and subsequent processing. The CPU 316 continuously and concurrently performs the processing of the flowchart illustrated in FIG. 7 and the processing of the flowchart illustrated in FIG. 9, while the remote communication is performed.

As mentioned above, the remote communication system (i.e., the display control system) according to the present exemplary embodiment includes the projectors 101a and 101b that can project an image transmitted from the office 2 (i.e., the remote place) on the screen 103. Further, the remote communication system includes the plurality of front side cameras 104 disposed on the screen 103. The CPU 316 performs the human feature portion extraction processing from each of a plurality of images obtained by the front side cameras 104 (see step S703) and the combination processing for obtaining a composite image from the plurality of images obtained by the plurality of front side cameras 104 (see step S706). Further, the remote communication system includes the projector 111 that can project the image obtained through the extraction processing and the combination processing on the screen 113 provided in the office 2.

The above-mentioned configuration enables a user of the remote communication system to communicate with a partner in a remote place with a feeling as if they face each other at a short distance.

Front image display control processing to be performed in step S905 will be described in detail below with reference to FIGS. 10 and 11A to 11C. To realize each operation (step) illustrated in a flowchart illustrated in FIG. 10, the CPU 316 of the office 1 executes the control program loaded from the ROM 318. The CPU 316 repetitively performs the processing of the flowchart illustrated in FIG. 10 at predetermined time intervals. Alternatively, the CPU 316 can perform the processing of the flowchart illustrated in FIG. 10 each time when a predetermined number of frame images have been received from the front side cameras 114. In the present exemplary embodiment, the frame images are included in videos received from the front side cameras 114.

The CPU 316 controls front image display processing in such a manner that the display position of a subject (i.e., person) image included in the front image (i.e., the second image) coincides with a predetermined position of the screen 103.

Figure 11A:
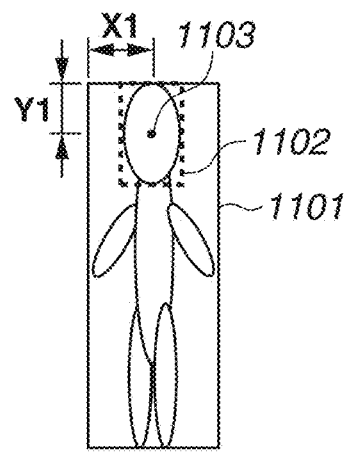
FIGS. 11A, 11B, and 11C illustrate processing for identifying a display position of a portrait image.

First, in step S1001, the CPU 316 detects a face image portion from the human feature portion image (hereinafter, referred to as "portrait image") generated in step S703. FIG. 11A illustrates the portrait image generated in step S703 in which a bounding rectangle 1102 is a bounding rectangle of a face portion.

For example, the Viola-Jones method is employable as a technique capable of detecting a face image portion from a portrait image. According to the Viola-Jones method, it is feasible to obtain the bounding rectangle 1102 of a face portion from the portrait image. The face image detection is not limited to the above-mentioned example. Any other method is employable if it can detect an image portion having predetermined feature information (e.g., shape, size, and position) from an image. For example, as an example of the employable method, the pattern matching method includes comparing the portrait image with a pattern image representing a human face and extracting a face image portion having a feature corresponding to the pattern image. According to the above-mentioned methods, it is feasible to detect a partial image having a predetermined shape from an image.

In the present exemplary embodiment, the CPU 316 detects a face image portion from a portrait image as described in detail below. However, the detection target is not limited to the face image portion and can be any other reference portion, such as an eye, a brow, a nose, a mouth, a shoulder, a hand, or a leg, included in the portrait image.

Next, in step S1002, the CPU 316 acquires coordinate information about a reference point of the detected face image portion. In the present exemplary embodiment, the reference point to be identified by the CPU 316 is a center 1103 of the bounding rectangle 1102 of the face image portion. The center 1103 of the bounding rectangle 1102 can be defined, for example, by an intersecting point of two diagonal lines of the bounding rectangle 1102. Alternatively, the center 1103 of the bounding rectangle 1102 can be defined by an intersecting point of a perpendicular bisector of a long side of the bounding rectangle 1102 and a perpendicular bisector of a short side of the bounding rectangle 1102.

However, the reference point is not limited to the center of the bounding rectangle 1102. For example, the reference point can be set to another appropriate position, such as a midpoint between a right eye and a left eye or a midpoint between both shoulders or hands (or legs). Further, the position of a nose or a mouth can be designated as the reference point. Alternatively, a user can designate the reference point of the portrait image by touching an arbitrary position of the screen 103, which accords with a part of the displayed portrait image, so that the CPU 316 can determine the designated position as the reference point. Further, the reference point can be set somewhere outside the portrait image.

In the present exemplary embodiment, an origin of the portrait image having been set beforehand is an upper left vertex of a bounding rectangle 1101. The CPU 316 acquires coordinates (X1, Y1) of the center 1103 of the bounding rectangle 1102 of the face image portion. The origin is not limited to the above-mentioned vertex position and can be set to any other arbitrary position. As mentioned above, the CPU 316 can identify the reference position included in the portrait image based on a detection result.

Then, in step S1003, the CPU 316 causes the projectors 101a and 101b to project the portrait image at a predetermined position of the screen 103. In the present exemplary embodiment, the CPU 316 performs the portrait image display control in such a way as to locate the reference point acquired in step S1002 to the predetermined position on the screen.

Figure 11B:
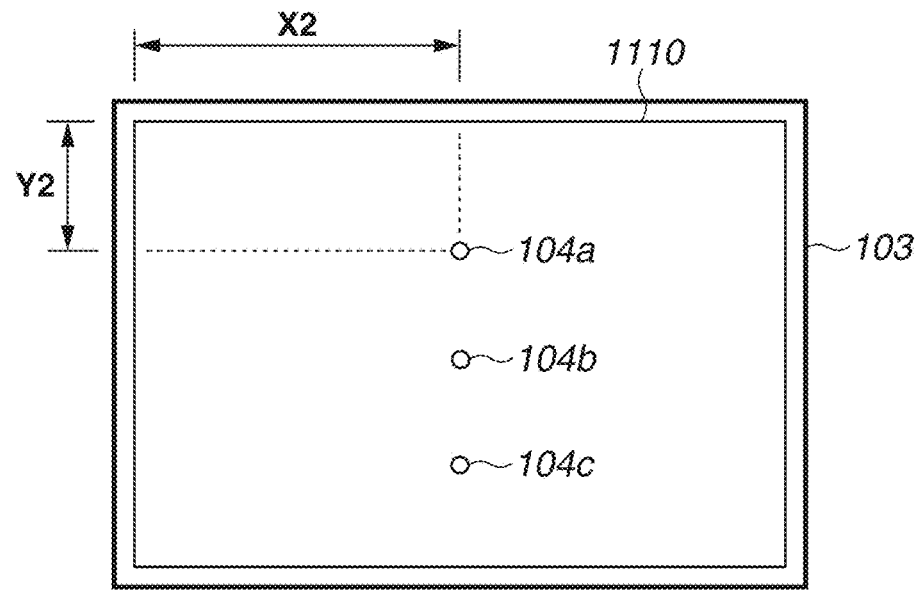
Figure 11C:
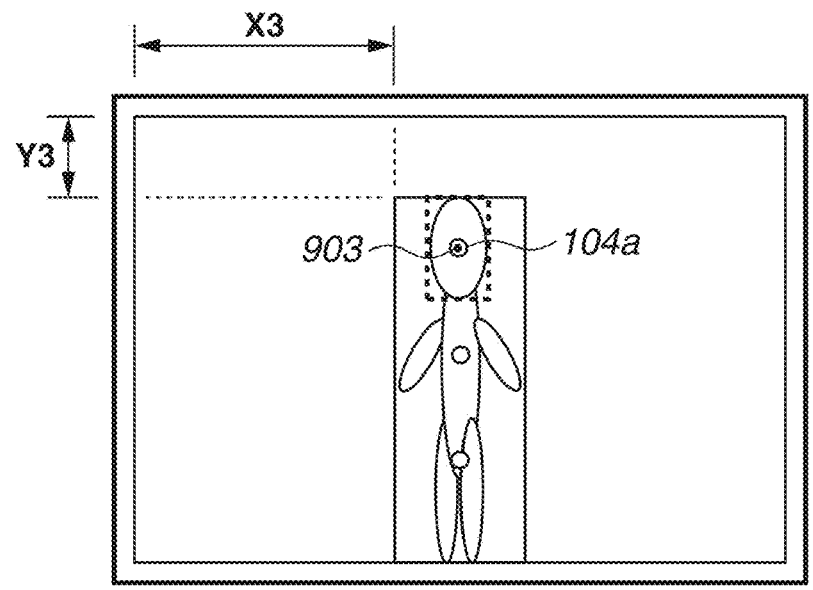

As illustrated in FIG. 11B, the origin having been set beforehand is the upper left of a projection region 1110 of an image projected by the projectors 101a and 101b. Offset coordinates (X2, Y2) represent the position of the front side camera 104a. FIG. 11C illustrates the front portrait image displayed in such a manner that the center 1103 of the face image coincides with the position of the camera 104a on the screen 103. As mentioned above, it is feasible to display the portrait image in such a way as to locate the identified reference position at the predetermined position of the screen 103. Display coordinates (X3, Y3) of the portrait image can be calculated in the following manner.

$$(X3, Y3) = (X2-X1, Y2-Y1)$$

Through the above-mentioned processing, the center of the face image can be displayed at the predetermined position of the screen 103. Therefore, when a user looks at the face image of a communication partner projected on the screen 103, the user unintentionally gazes at the camera 104a. As a result, the camera 104a can capture an image of the user in a state where the gazing direction of the user coincides with the camera 104a. When the captured image of the user is projected on a screen of another site, the communication partner can communicate with the projected user with coincided gazing directions thereof.

The present disclosure is not limited to the above-mentioned example, in which the portrait image is displayed on the screen 103 in such a manner that the center of the face included in a received portrait image coincides with the camera 104a. The relative relationship between the position of the camera 104a and the reference point of the portrait image can be arbitrarily determined. The detection of the face image can be performed by the control apparatus 310 of the office 1. Alternatively, a control apparatus provided in the office 2 can detect a face image portion from a portrait image. Similarly, the processing for moving the display position of a portrait image in such a manner that the reference point (e.g., the center of a face) of the portrait image coincides with the position of the camera 104a can be performed by the control apparatus 310 of the office 1 or by the control apparatus provided in the office 2.

Figure 12A:
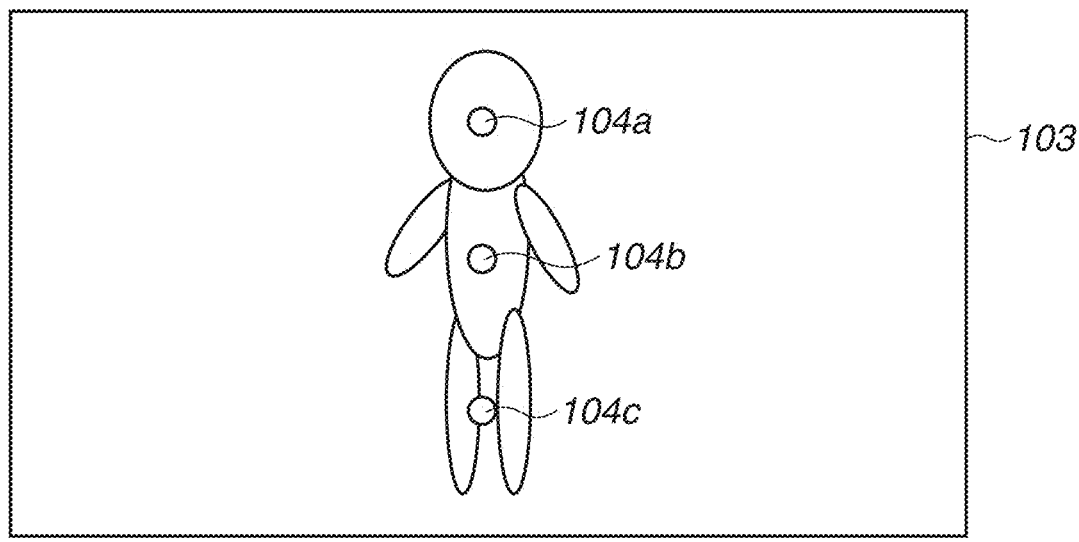
FIGS. 12A and 12B illustrate switching of display processing.

As mentioned above, in a case where the image to be displayed on the screen 103 is a portrait image generated based on images captured by the front side cameras 104a, 104b, and 104c, the display control system displays the portrait image at an appropriate position corresponding to the positions of the cameras 104a, 104b, and 104c, as illustrated in FIG. 12A. As mentioned above, users can communicate with each other with coincided gazing directions thereof.

Figure 12B:
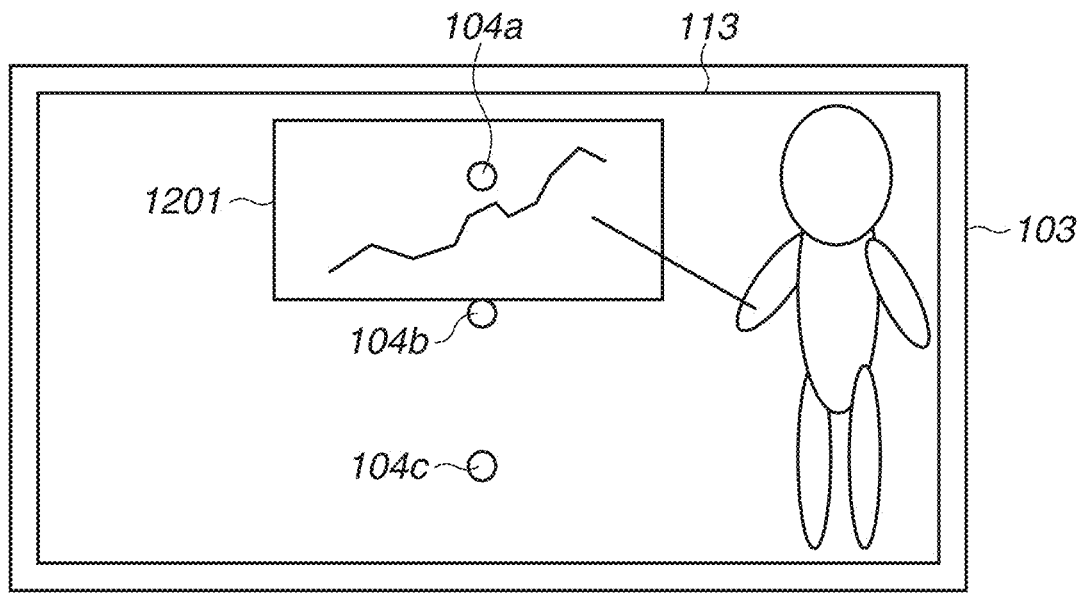

On the other hand, in a case where the image to be displayed on the screen 103 is an image generated based on an image captured by the rear side camera 115, the display control system displays the captured image directly without taking the position of the portrait image portion into consideration, as illustrated in FIG. 12B. For example, to display the image (i.e., the first image) generated from the image captured by the camera 115 on the screen 103, the projector I/F 313 causes the projectors 101a and 101b to project an image of a human feature portion included in the first image together with an image displayed on the screen 113.

As mentioned above, the display control system does not perform the above-mentioned processing for matching the gazing directions with each other when the image to be displayed on the screen 103 is the entire image including not only a person in the office 2 but also an image 1201 displayed on the screen 113. The above-mentioned display control brings an effect of realizing a screen display easy to see for a user, compared to a case where the display control is performed in such a manner that the position of a portrait image portion included in an image captured by the rear side camera 115 coincides with the position of the camera 104a.

As described above, if the display target to be projected on the screen 103 is the image (i.e., the first image) generated from the image captured by the camera 115, the projector I/F 313 controls the projectors 101a and 101b in such a way as to display the first image on the screen 103 irrespective of the position of a subject image included in the first image. Further, if the display target to be projected on the screen 103 is the image (i.e., the second image) generated from the images captured by the cameras 114a, 114b, and 114c, the projector I/F 313 controls the projectors 101a and 101b in such a way as to display a subject image included in the second image at a predetermined position of the second screen.

Accordingly, the present exemplary embodiment brings an effect of selectively determining whether to perform the processing for adjusting the gazing directions between communicating persons according to a target image to be displayed on the screen. Therefore, the display control system having higher convenience for a user can be provided according to the present exemplary embodiment.

The control apparatus provided in the office 2 can control the projector 111 in such a way as to project an image of a conference material at a predetermined position (e.g., the center) of the screen 113 while an image captured by the rear side camera 115 is displayed on the screen 103 of the office 1.

The control apparatus provided in the office 2 determines as to whether an image derived from images captured by the cameras 114 or an image derived from an image captured by the camera 115 is displayed on the screen 103 of the office 1. For example, the control apparatus 310 of the office 1 transmits information indicating a target image to be displayed on the screen 103 to the control apparatus of the office 2. Then, the control apparatus of the office 2 performs the above-mentioned determination processing based on the information received from the control apparatus 310 of the office 1.

If it is determined that the target image to be displayed on the screen 103 of the office 1 is the image derived from the image captured by the camera 115, the control apparatus of the office 2 performs control to display a conference material image at a position, corresponding to a predetermined position of the screen 103, on the screen 113.

The control apparatus of the office 1 controls the display position of the conference material image on the screen 113 in such a manner that the conference material can be displayed at the position corresponding to the setup position of the cameras 104a, 104b and 104c, as illustrated in FIG. 11B. Therefore, according to the above-mentioned configuration, when a user in the office 1 looks at the conference material image, the user naturally gazes at the cameras 104a, 104b, and 104c. Accordingly, the cameras 104a, 104b, and 104c can capture images of a person who faces the cameras 104a, 104b, and 104c in the office 1, and the control apparatus of the office 1 can transmit the captured image to the office 2. As a result, the image of the person who is gazing at the camera in the office 1 can be displayed on the screen of the office 2.

According to the present disclosure, the display control apparatus can selectively determine whether to perform processing for adjusting the gazing directions between communicating persons according to a target image to be displayed on the screen. As mentioned above, an image of a person existing in the office 1 can be displayed in such a manner that confirming the facial expression of the person existing in the office 1 is easy for a user who exists in the office 2 and looks at the image captured by the cameras 104a, 104b, and 104c. Therefore, the display control system having higher convenience for a user can be provided according to the present exemplary embodiment.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-095883, filed May 8, 2015, which is hereby incorporated by reference herein in its entirety.

What is claimed is:

1. A display control system, comprising:
   a first imaging unit and a second imaging unit and a first screen, which are installed on a first site,
   a third imaging unit and a fourth imaging unit and a second screen, which are installed on a second site different from the first site,
   wherein the first imaging unit is configured to image a first subject in a state where the first imaging unit is directed toward the first screen, the second imaging unit is configured to image at least a part of the first subject from a first screen side in an opposite direction of an imaging direction of the first imaging unit, the third imaging unit is configured to image a second subject image in a state where the third imaging unit is directed toward the second screen, the fourth imaging unit is included in the second screen and configured to image at least a part of the second subject image in an opposite direction of an imaging direction of the third imaging unit, and
   a display control unit configured to perform first display control to display a first image captured by the first imaging unit, on the second screen, without changing a position of the first subject image included in the first image, in a case where the first image is to be displayed on the second screen, and configured to perform second display control to change a display position of the first subject image included in a second image captured by the second imaging unit, to a predetermined position of the second screen and display the second image on the second screen, in a case where the second image is to be displayed on the second screen,
   wherein the predetermined position is a setup position of the fourth imaging unit.

2. The display control system according to claim 1, further comprising:
   an extraction unit configured to extract images; and
   a generation unit configured to combine the images extracted by the extraction unit,
   wherein a plurality of second image units are arrange on the first site,
   wherein the extraction unit extracts at least a part of the first subject image from a plurality of images captured by the plurality of second imaging units, and
   wherein the generation unit combines the images extracted by the extraction unit to generate the second image.

3. The display control system according to claim 1, wherein the display control unit performs the first display control to display an image displayed on the first screen together with the first subject image included in the first image on the second screen.

4. The display control system according to claim 1, further comprising:
   a detection unit configured to detect a portion having a predetermined shape from the first image; and
   an identification unit configured to identify a reference position of the first image based on a detection result obtained by the detection unit,
   wherein the display control unit performs the second display control to display the first image on the second screen in such a manner that the reference position identified by the identification unit coincides with the predetermined position of the second screen.

5. The display control system according to claim 1, further comprising:
   an input unit configured to input an image; and
   a second display control unit configured to perform control to display the image input by the input unit at a predetermined position of the first screen based on the instruction for the first display control on the second screen,
   wherein the predetermined position of the first screen is a position corresponding to a setup position of the second imaging unit.

6. The display control system according to claim 1,
   wherein the second site includes a projection unit configured to display an image on the second screen, and
   wherein the display control unit controls the projection unit to display an image on the second screen.

7. A display control apparatus, comprising:
   a reception unit configured to:
      receive an image captured by a first imaging unit and an image captured by a second imaging unit, which are installed on a first site with a first screen, and
      receive an image captured by a third imaging unit and an image captured by a fourth imaging unit, which are installed on a second site different from the first site with a second screen, wherein the first imaging unit is configured to image a first subject in a state where the first imaging unit is directed toward the first screen, the second imaging unit is configured to image at least a part of the first subject from a first screen side in an opposite direction of an imaging direction of the first subject, the third imaging unit is configured to image a second subject image in a state where the third imaging unit is directed toward the second screen, the fourth imaging unit is included in the second screen and configured to image at least a part of the second subject image in an opposite direction of an imaging direction of the third imaging unit, and a display control unit configured to perform first display control to display a first image captured by the first imaging unit, on the second screen without charging a position of the first subject image included in the first image, in a case where the first image is to be displayed on the second screen, and configured to perform second display control to change a display position of the first subject image included in a second image captured by the second imaging unit, to a predetermined position of the second screen and display the second image on the second screen, in a case where the second image is to be displayed on the second screen, wherein the predetermined position is a setup position of the fourth imagine unit.

8. The display control apparatus according to claim 7, further comprising:
an extraction unit configured to extract images; and
a generation unit configured to combine the images extracted by the extraction unit,
wherein the reception unit receives a plurality of images from a plurality of second imaging units,
wherein the extraction unit extracts at least a part of the first subject image from the plurality of images received by the reception unit, and
wherein the generation unit combines the images extracted by the extraction unit to generate the second image.

9. The display control apparatus according to claim 7, further comprising a projection unit configured to display an image on the second screen,
wherein the display control unit perform controls the projection unit to display an image on the second screen.

10. A display control method, comprising:
causing a first imaging unit installed on a first site to image a first subject in a state where the first imaging unit is directed toward a first screen installed at the first site;
causing a second imaging unit installed on the first site to image at least a part of the first subject from a first screen side in an opposite direction of an imagining direction of the first imaging unit;
causing a third imaging unit installed at a second site different from the first site to image a second subject image in a state where the third imaging unit is directed toward a second screen installed at the second site;

causing a fourth imaging unit installed at the second site to image at least a part of the second subject image in an opposite direction of an imaging direction of the third imaging unit; and causing a display control unit to perform first display control to display a first image captured by the first imaging unit, on the second screen, without changing a position of the first subject image included in the first image, in a case where the first image is to be displayed on the second screen, and perform second display control to change a display position of the first subject image included in a second image captured by the second imaging unit, to a predetermined position of the second screen and display the second image on the second screen, in a case where the second image is to be displayed on the second screen, wherein the predetermined position is a setup position of the fourth imaging unit.

11. The display control method according to claim 10, further comprising:
causing an extraction unit to extract images; and
causing a generation unit to combine the images extracted by the extraction unit,
wherein a plurality of second image units are arrange on the first site,
wherein the extraction unit extracts at least a part of the first subject image from a plurality of images captured by the plurality of second imaging units, and
wherein the generation unit combines the images extracted by the extraction unit to generate the second image.

12. The display control method according to claim 10, wherein, the display control includes performing the first display control to display an image displayed on the first screen together with the first subject image included in the first image on the second screen.

13. The display control method according to claim 10, further comprising:
causing a detection unit to detect a portion having a predetermined shape from the first image; and
causing an identification unit to identify a reference position of the first image based on a detection result obtained by the detection unit,
wherein the display control includes performing the second display control to display the first image on the second screen in such a manner that the reference position identified by the identification unit coincides with the predetermined position of the second screen.

14. The display control method according to claim 10, further comprising:
causing an input unit to input an image; and
performing control to display the image input by the input unit at a predetermined position of the first screen based on the instruction for the first display control on the second screen,
wherein the predetermined position of the first screen is a position corresponding to a setup position of the second imaging unit.

* * * * *